Jan. 1, 1957 W. RODDER 2,775,808
FLYING HOT SAW
Filed Aug. 10, 1953 11 Sheets-Sheet 3

INVENTOR.
WILLIAM RODDER
BY Bosworth, Sessions,
Herstrom & Williams
ATTORNEYS

Jan. 1, 1957
W. RODDER
2,775,808
FLYING HOT SAW
Filed Aug. 10, 1953
11 Sheets-Sheet 4
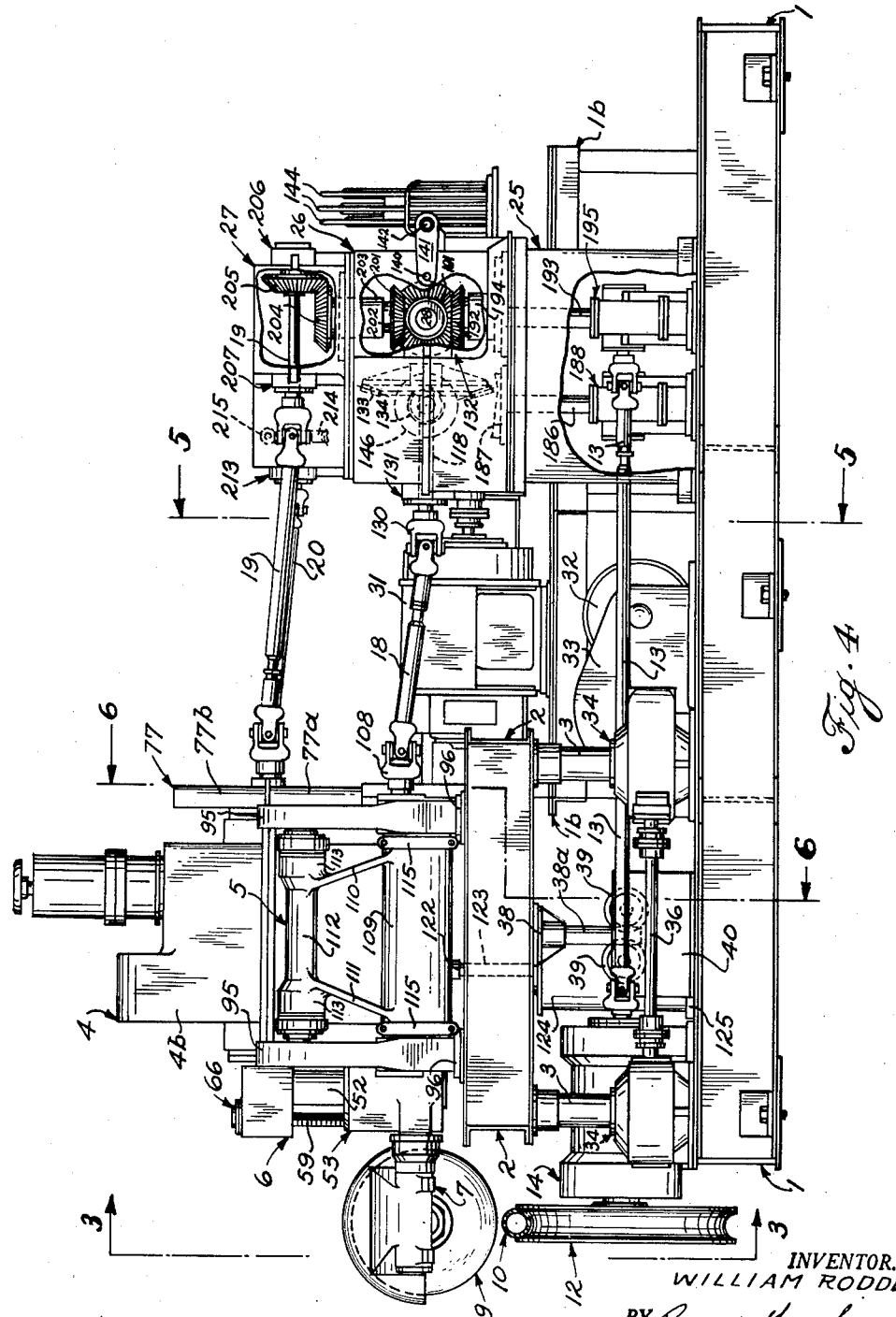
INVENTOR.
WILLIAM RODDER
BY Bosworth, Sessions,
Herntron & William
ATTORNEYS

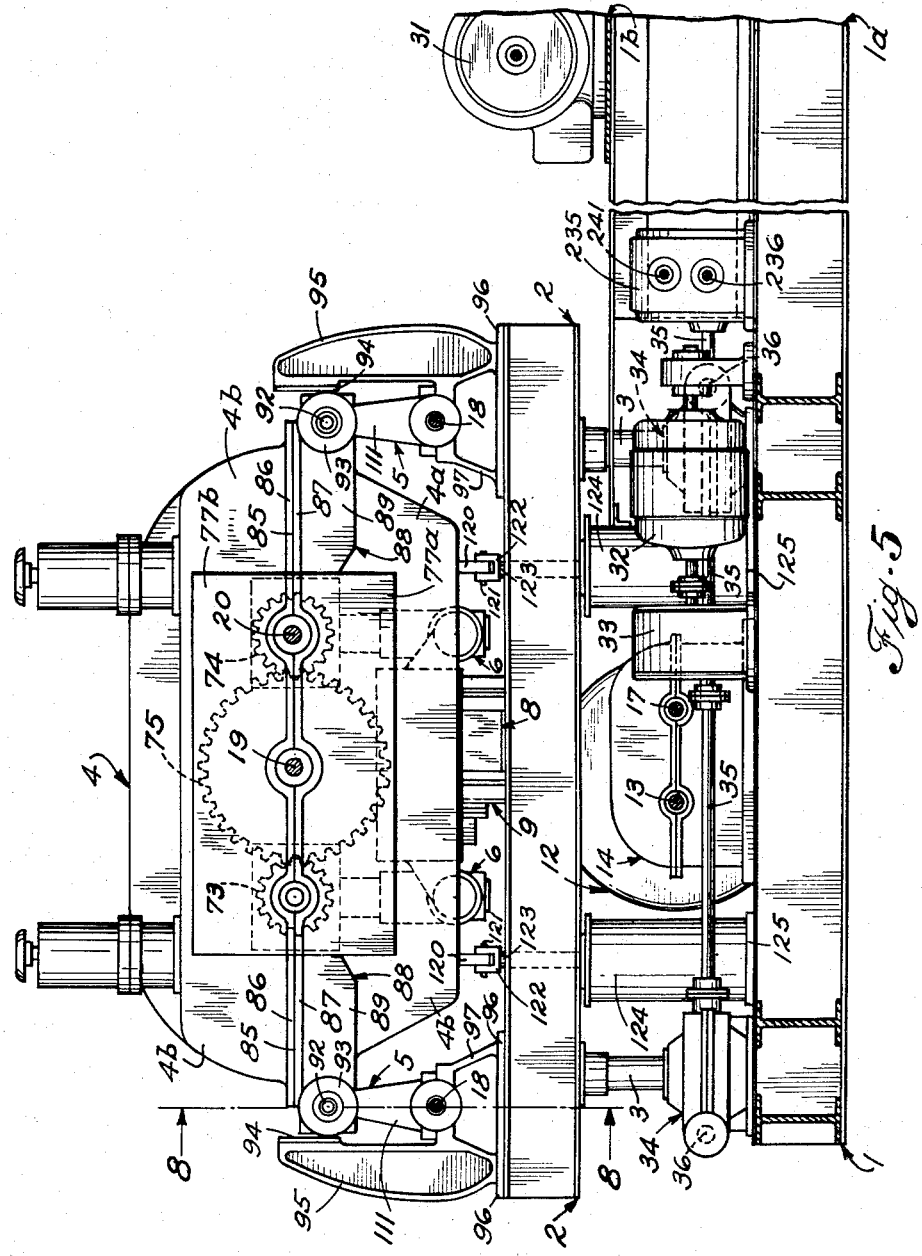

Jan. 1, 1957  W. RODDER  2,775,808
FLYING HOT SAW
Filed Aug. 10, 1953  11 Sheets-Sheet 6
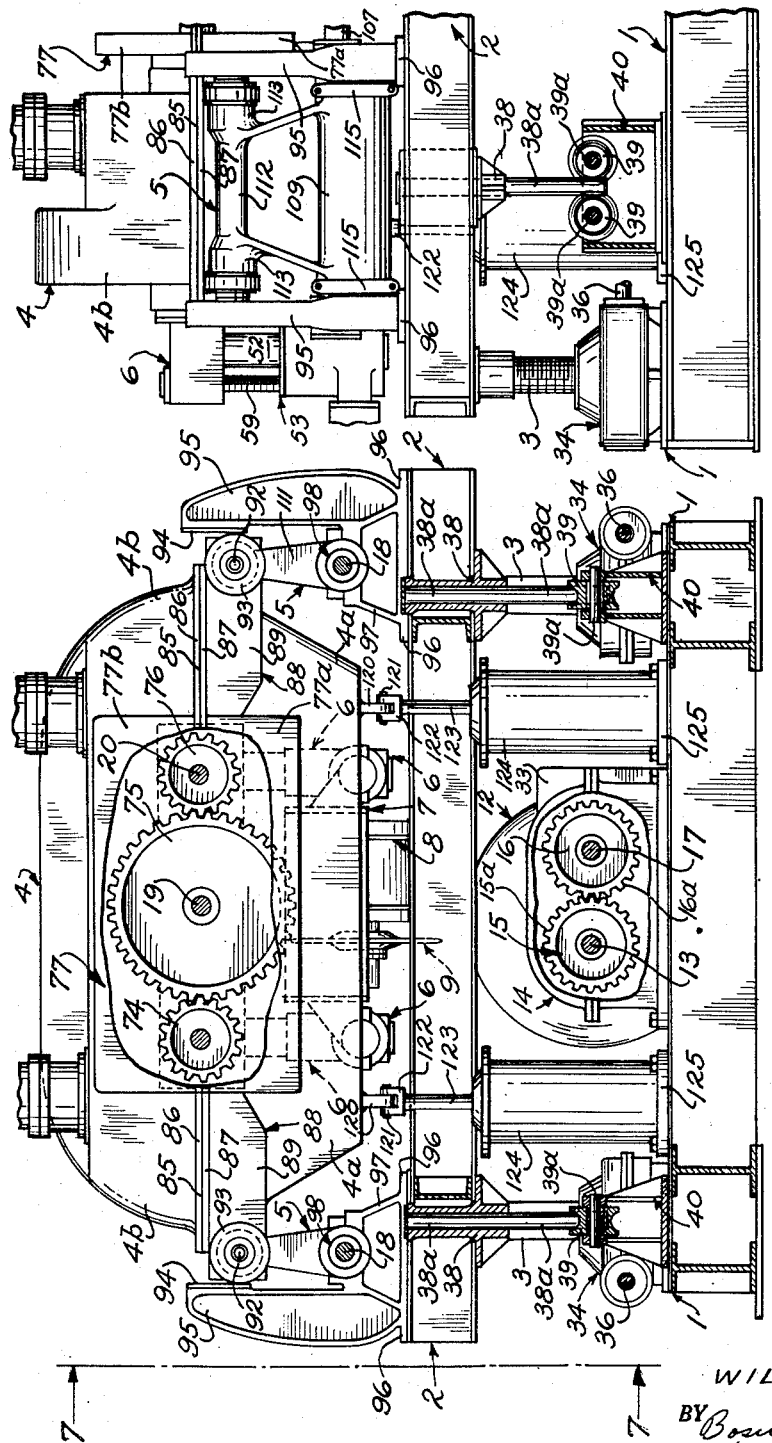
INVENTOR.
WILLIAM RODDER
BY Bosworth, Sessions,
Herntron & Williams
ATTORNEYS

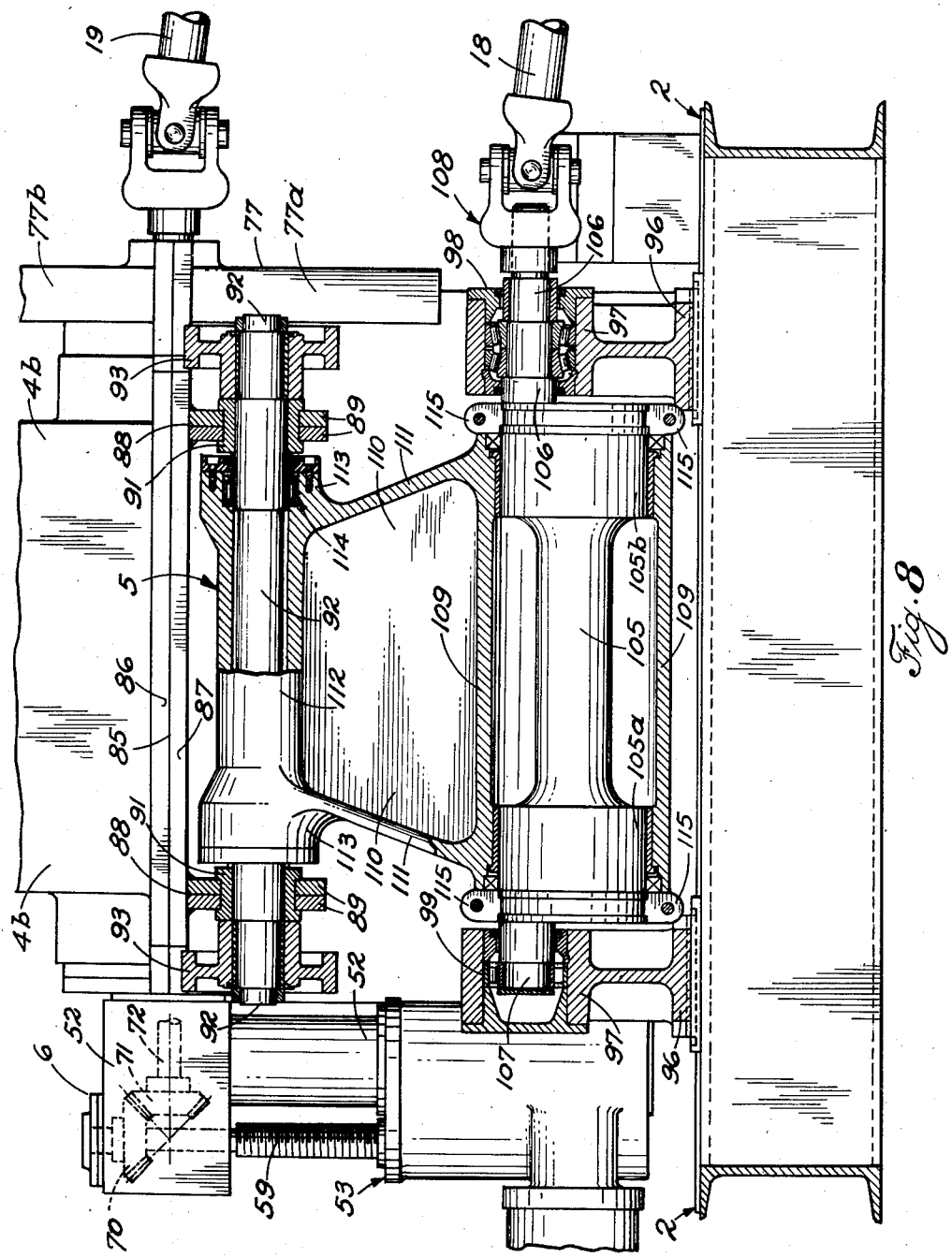

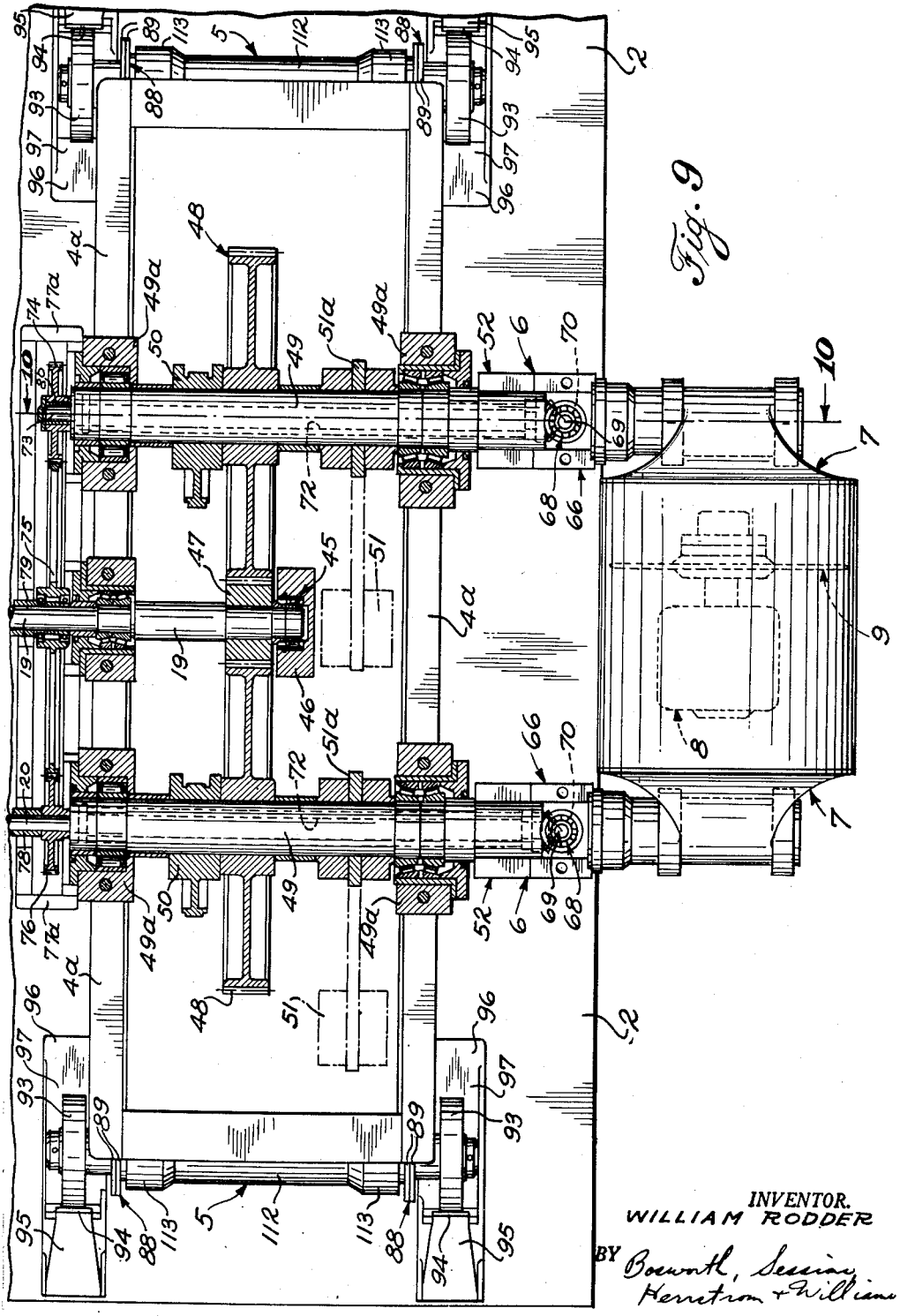

Jan. 1, 1957   W. RODDER   2,775,808
FLYING HOT SAW
Filed Aug. 10, 1953   11 Sheets-Sheet 9

INVENTOR.
WILLIAM RODDER
BY Bosworth, Sessions,
Herrstrom & Williams
ATTORNEYS

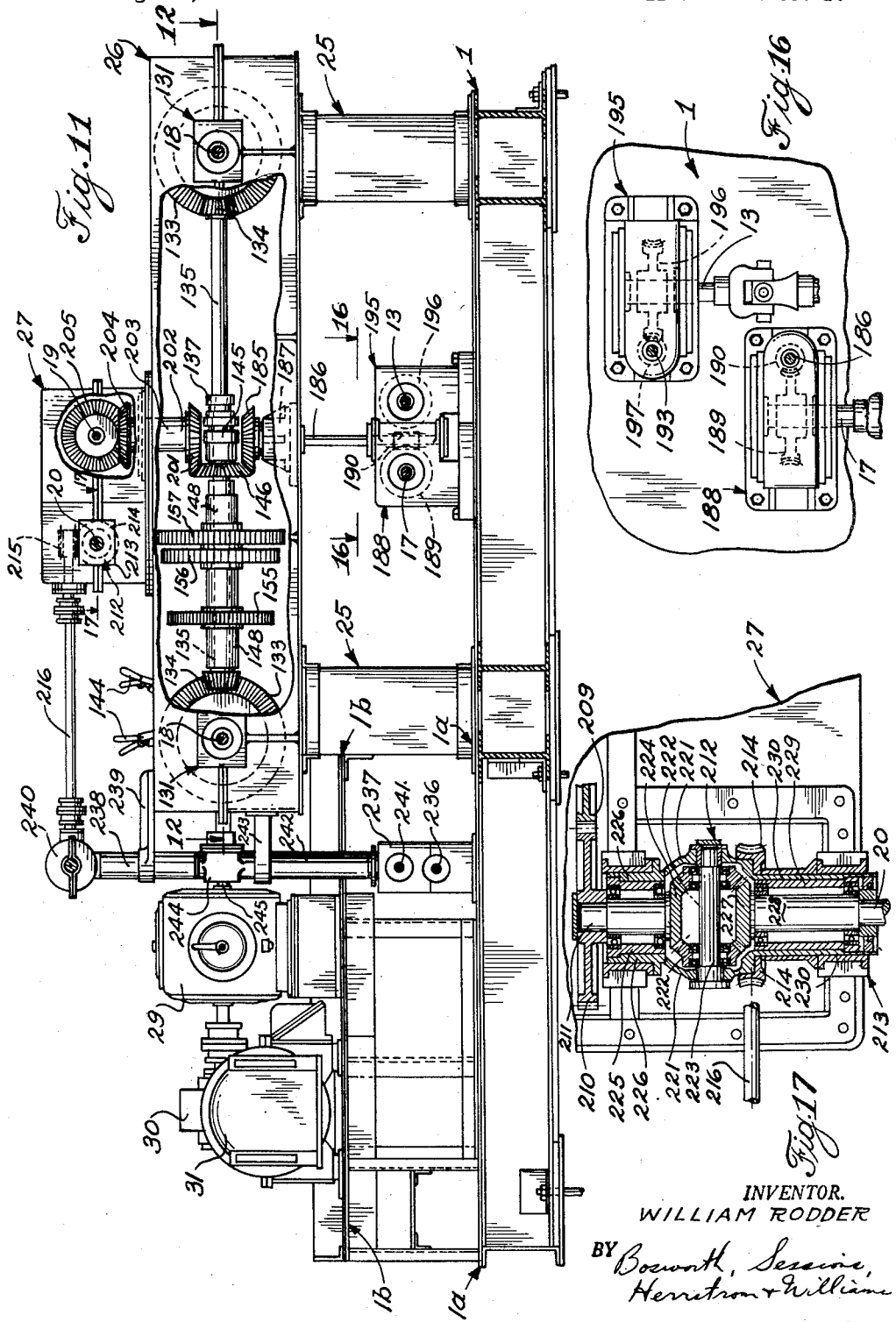

Jan. 1, 1957
W. RODDER
2,775,808
FLYING HOT SAW
Filed Aug. 10, 1953
11 Sheets-Sheet 11
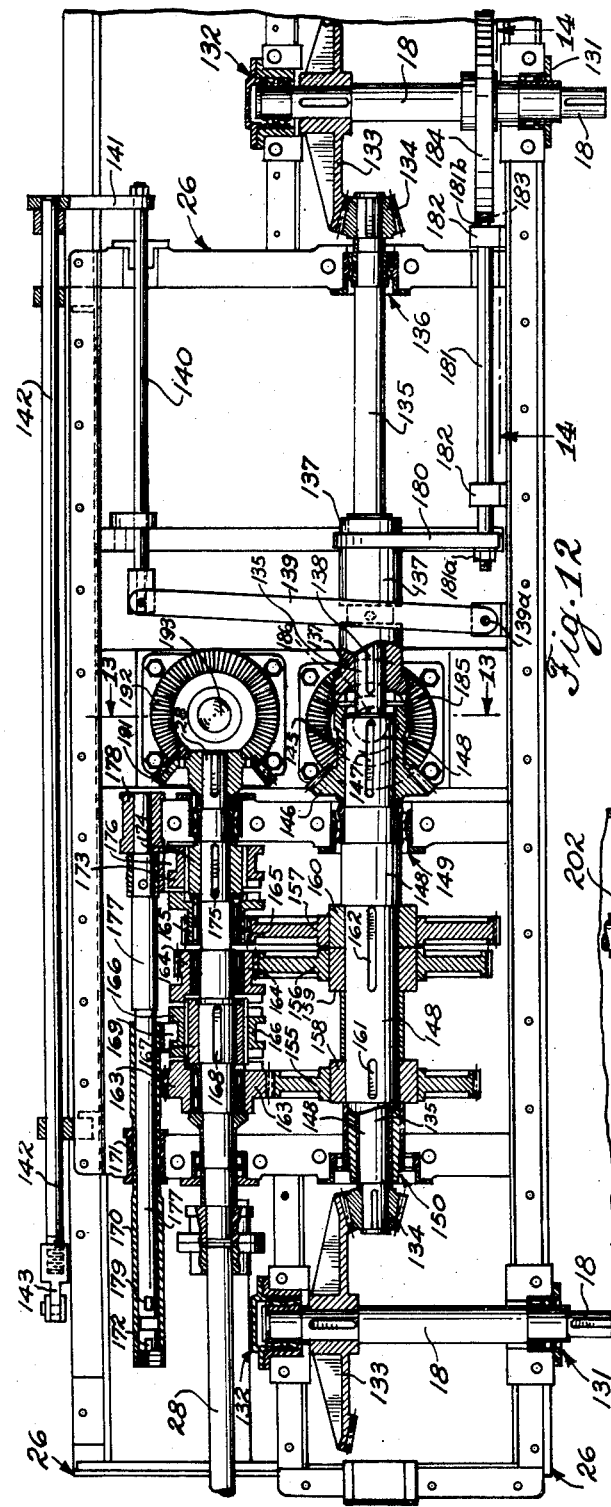
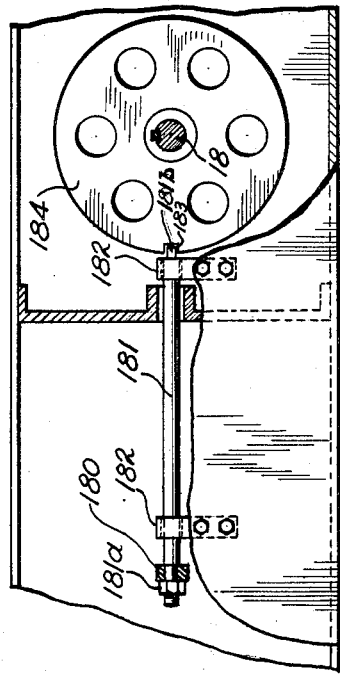
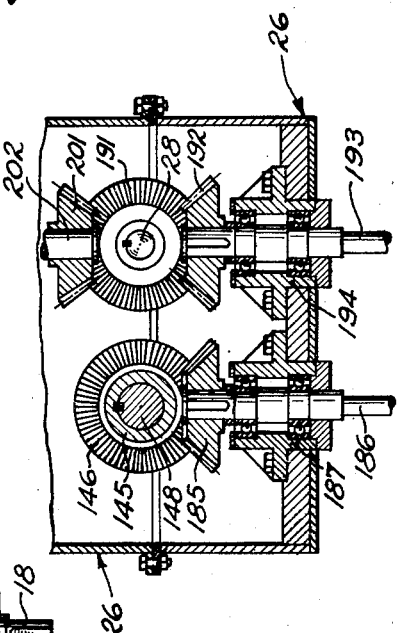
INVENTOR.
WILLIAM RODDER
BY *Bosworth, Sessions,*
*Herrstrom & Williams*
ATTORNEYS

# United States Patent Office 2,775,808
Patented Jan. 1, 1957

2,775,808

FLYING HOT SAW

William Rodder, Poland, Ohio, assignor to The Aetna-Standard Engineering Company, Pittsburgh, Pa., a corporation of Ohio Application August 10, 1953, Serial No. 373,329

17 Claims. (Cl. 29—69)

This invention relates to apparatus for cutting off successive lengths from continuously moving stock, and more particularly to flying saws for severing rapidly moving tubing, pipe, rod or the like into accurately cut lengths as the material emerges from a mill. The apparatus described herein is designed particularly for sawing welded pipe into lengths but it is to be understood that the invention has other uses and applications.

In the manufacture of steel pipe by a well-known process, skelp is heated to welding temperature in a furnace and then passed at high speed through forming and welding rolls in which the skelp is formed into tubular shape and the abutting edges welded together to form the pipe. The skelp is supplied in large coils and the forward end of one coil is welded to the trailing end of the preceding coil before the skelp enters the furnace, thus making it possible to carry on the welding operation for relatively long periods of time without interruption. Mills of this type operate at high rates of speed. It is therefore necessary to provide some sort of flying cut-off mechanism in order to cut the pipe into lengths as it emerges from the mill at speeds of, for example, as high as one thousand feet per minute.

A flying saw or cut-off that successfully meets the requirements of mills of this type is disclosed and claimed in my Patent No. 2,645,001, issued July 14, 1953. The apparatus of my said patent comprises a circular saw or other cutting tool which is carried in a circular path or orbit by a rotary support that preferably takes the form of a crank mechanism. Means are provided for guiding the work in a path disposed in a plane parallel to the plane of the circular path of rotation of the cutting tool, the direction of action of the cutting tool being perpendicular to the path of the work. The cutting tool is rotated by driving mechanism either mechanically or electrically synchronized with the driving mechanism of the mill so that the rotational movement of the tool is in timed relationship with the lineal speed of the work. The work is guided in a path which is normally adjacent to, but which does not intersect, the circular path of the cutting tool; means are provided, however, for periodically deflecting the work from its normal path into the path of the cutting tool thereby to sever the stock.

Apparatus of the type disclosed in my said patent operates with great success and is advantageous in that the deflection of the work into the path of the saw makes it possible to carry out the cutting operation accurately because the cut takes place within only a small amount of angular travel of the saw in its orbit and also is advantageous in that the periodic deflection of the pipe or tube into the path of the saw makes it possible accurately to cut the pipe into a wide range of commercial lengths without requiring crank arms of excessive lengths, because the apparatus can be adjusted, for example, to make one cut for every two, three or four revolutions of the saw in its orbital path. However, the deflection of the work into the path of the saw necessarily involves the bending of the work by the supporting cam at the time the cut is made. With pipe or tubing of relatively small diameter, e. g., up to 2 or 3 inches, the bending of the pipe presents no difficulty, but the mass and rigidity of larger pipe make the deflection of the pipe into the path of the saw more difficult and the difficulty is enhanced by the fact that the greater the diameter of the pipe the greater the amount of deflection that is required to enable the saw to pass through the work.

According to the present invention, flying hot saws of the general type disclosed in my aforesaid patent are adapted to the handling of work of relatively large diameters; e. g., from 2 or 3 inches up to 6 inches, by superimposing upon the movement of the saw in its normal orbit an additional movement of the entire rotary support for the saw assembly toward and away from the path of the work, thereby moving the orbital path of the saw toward the path of the work at the time it is desired to make a cut. In a preferred embodiment of the invention, this result is accomplished by vertically reciprocating the superstructure upon which the rotary support for the saw assembly is mounted so that the saw assembly is moved to its lowest point toward the path of the work at the time that it is desired to make a cut. In the preferred form of the invention disclosed herein this movement of the rotary support takes place at the same time the pipe or other workpiece is deflected upwardly toward the path of the saw. By this combination of deflecting the pipe from its normal path and bodily moving the rotary support so that the normal orbital path of the saw is moved toward the path of the pipe, the saw can be made to pass completely through the pipe without excessive deflection of the pipe or excessive vertical reciprocation of the rotary support. It is contemplated, however, that for some purposes the deflection of the workpiece may be eliminated and the movement of the rotary support for the saw assembly solely relied upon to obtain the necessary intersection of the paths of the saw and workpiece and the resultant cutting of the workpiece by the saw. In a preferred form of hot saw embodying the invention the reciprocatory movement of the saw assembly is produced by the use of cranks, eccentrics or their kinematic equivalents (hereinafter referred to as crank assemblies) that are interposed between the superstructure and the supporting structure so that the path of the saw is the resultant of the motions produced by the rotary support for the saw assembly and by the crank assemblies that move the superstructure. Also, means are provided for balancing at least partially the inertia forces due to reciprocatory movement of the superstructure near the lower extreme of its path of travel.

In the drawings, in which a preferred form of apparatus embodying the invention is shown:

Figure 3 is a front elevation of the apparatus on substantially the same scale as Figure 1 showing, among other things, the deflecting cam, the saw-supporting cranks and, at the sides of the apparatus, the two lateral crank assemblies that reciprocate the saw assembly;

Figure 4 is a side elevation of the apparatus, the same indicating by line 3—3 the portion of the apparatus seen in Figure 3;

Figure 5 is a rear elevation of the forward portion of the apparatus as seen from lines 5—5 of Figures 1 and 4;

Figure 6 is a generally similar rear elevation as seen from line 6—6 of Figure 4 with certain of the parts in section;

Figure 7 is a fragmentary side elevation of the apparatus of Figure 6 as seen from line 7—7 of Figure 6;

Figure 8 is an enlarged vertical section, with parts in elevation, through one of the lateral crank assemblies seen in Figures 3, 5 and 6, the section being taken on line 8—8 of Figure 5;

Figure 9 is an enlarged horizontal section taken on line 9—9 of Figure 3;

Figure 11 is an elevation of the after portion of the apparatus as seen from line 11—11 of Figure 1;

Figure 12 is a horizontal section of part of the after portion of the apparatus, the section being taken on line 12—12 of Figure 11;

Figure 13 is a vertical section through part of the after portion of the apparatus as seen from line 13—13 of Figure 12;

Figure 14 is a fragmentary elevation of parts of the after portion of the apparatus as seen from line 14—14 of Figure 12;

Figure 15 is an enlarged side elevation of one of the lifting bars appearing in Figures 3, 5 and 6;

Figure 16 is a fragmentary plan of part of the after portion of the apparatus as seen from line 16—16 of Figure 11; and, Figure 17 is a fragmentary plan of the differential as seen from line 17—17 of Figure 11.

Figure 1:
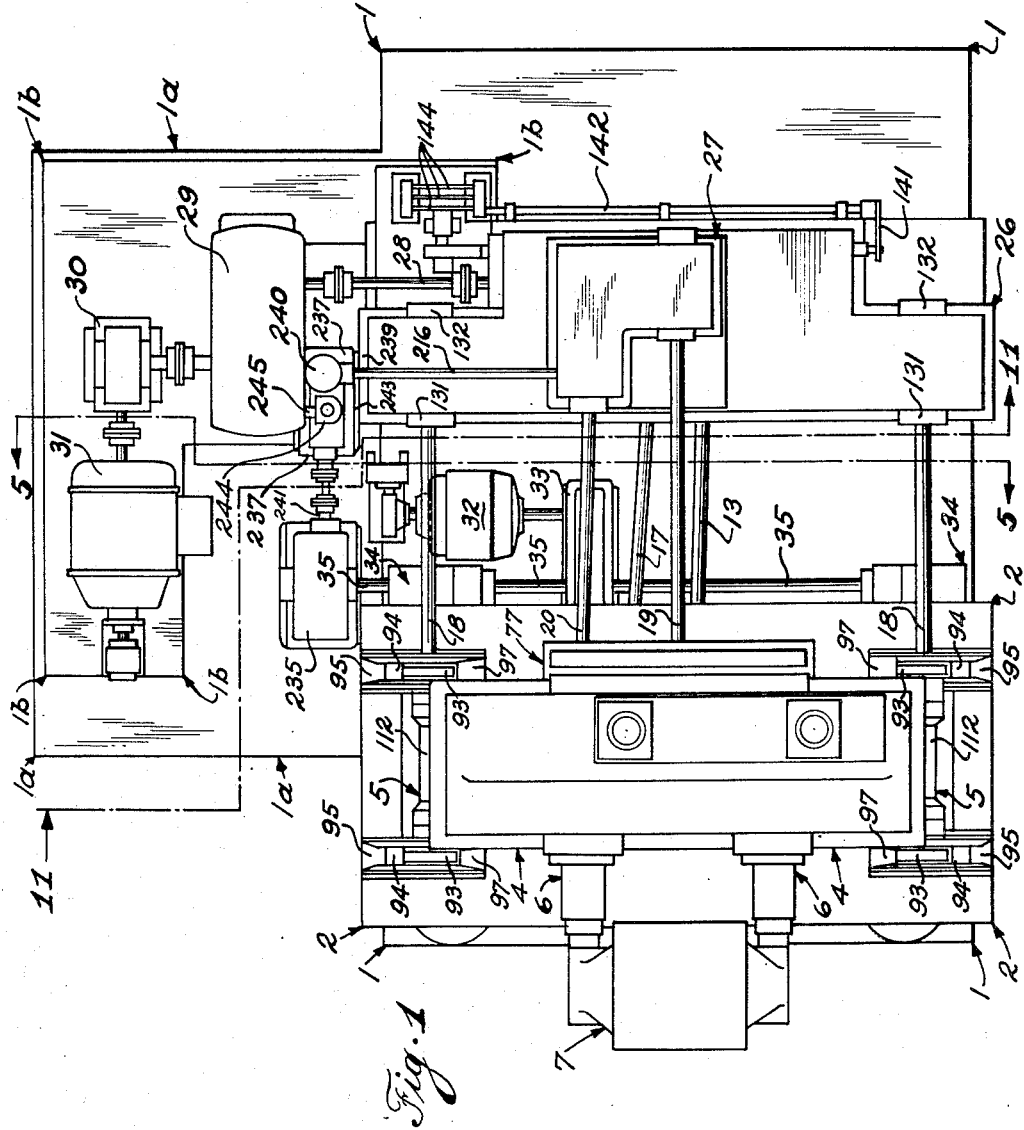
Figure 1 is a diagrammatic plan of the apparatus as a whole, from which, in the interests of clarity, certain of the smaller components have been omitted.

Referring first to Figures 1 to 4 the apparatus has a base or primary supporting structure 1 taking the form of a shallow framework made up of structural steel members and plates. The base is generally rectangular in shape and has a generally rectangular extension 1a off to one side thereof, as indicated in Figure 1. The various structural steel members of which it is formed are fastened directly to the mill floor and the other components of the apparatus are mounted on the base.

The primary supporting structure 1 supports a smaller secondary supporting structure 2, likewise made up of structural steel members and plates and approximately co-extensive with the forward portion of the apparatus, extending rearwardly to about the middle of the apparatus as a whole. Secondary supporting structure 2 is mounted for vertical adjustment on primary supporting structure 1 by means of jacks 3 located beneath the four corners of secondary supporting structure 2. Jacks 3 are of the screw type, being located, constructed and operated similarly to the screw jacks of said Patent No. 2,645,001. They are represented in the accompanying drawings as shielded by telescopically arranged sleeves.

Located directly above secondary supporting structure 2 is a movably mounted superstructure 4 made up of a lower section 4a and an upper section 4b as shown in Figure 3. Superstructure 4 is moved vertically in a manner explained hereinafter by means of two lateral crank assemblies 5, one on each side of superstructure 4. The crank assemblies are mounted on secondary supporting structure 2.

In order to carry the saw assembly in the desired orbital path a rotary support for the saw assembly is provided by two saw-supporting cranks 6 that are mounted at the front end of the superstructure 4. See Figures 3, 4, 9 and 10. Carriage 7, supported by the cranks, carries the saw motor 8 and the circular saw 9; rotation of the cranks carries the saw assembly, made up of the carriage, motor and saw, in a circular orbital path. As a result of such movement, saw-supporting cranks 6 bring saw 9 periodically into juxtaposition to the work 10 as indicated in Figure 4. The work 10 is supported by a cam 12 having a notch 11 in the periphery thereof (Figure 3).

Cam 12 may, if desired, be made more or less pear-shaped, as in said Patent No. 2,645,001, or may be generally circular, as in Figure 3. Cam 12 is driven in synchronism with the orbital travel of the saw 9 so that the saw blade is received in notch 11 when the work is severed; the final drive of the cam is by a shaft 13 the outer end of which is provided with a retaining cap 13a. Shaft 13, which passes through gear box 14 (Figures 3, 4 and 5), extends from the forward portion to the after portion of the apparatus where it is driven as hereinafter described. As indicated in Figure 4, it is of telescopic construction and incorporates two universal joints, one in the forward portion and the other in the after portion of the apparatus.

An eccentric 15 in gear box 14 (Figures 3 and 6) serves to displace cam shaft 13, in the manner described in said Patent No. 2,645,001, in order to raise the cam and the work 10 when it is desired to make a cut and to lower the cam and the work out of the path of the saw in between cuts. Eccentric 15 is driven by a ring gear 15a meshing with a like ring gear 16a mounted on a carrier 16 that is keyed to and driven by eccentric drive shaft 17 (Figure 6). Like cam shaft 13, eccentric shaft 17 is a telescopic shaft extending rearwardly from gear box 14 in the forward portion of the apparatus to the after portion thereof. As explained hereinafter, it is driven from the same power source as cam shaft 13.

In order to lower and raise the superstructure 4 and thus move the orbit of the saw toward and away from the path of the work, the lateral crank assemblies 5 are driven by two inclined telescopic shafts 18, each incorporating two universal joints. The shafts extend rearwardly from the forward portion of the apparatus and, as is apparent from Figure 4, cross the open access area between the forward and after portions of the apparatus well above the level of the cam shaft 13 and eccentric shaft 17. The latter, being on the far side of cam shaft 13, does not itself appear in Figure 4. At a still higher level are two other inclined telescopic shafts 19 and 20, each incorporating two universal joints, the former for driving the saw-supporting cranks 6 and the latter for driving the crank-adjusting means forming part of saw-supporting cranks 6. Like cam shaft 13 and eccentric shaft 7, shafts 18, 19 and 20 are driven at the rear of the apparatus.

Figure 2:
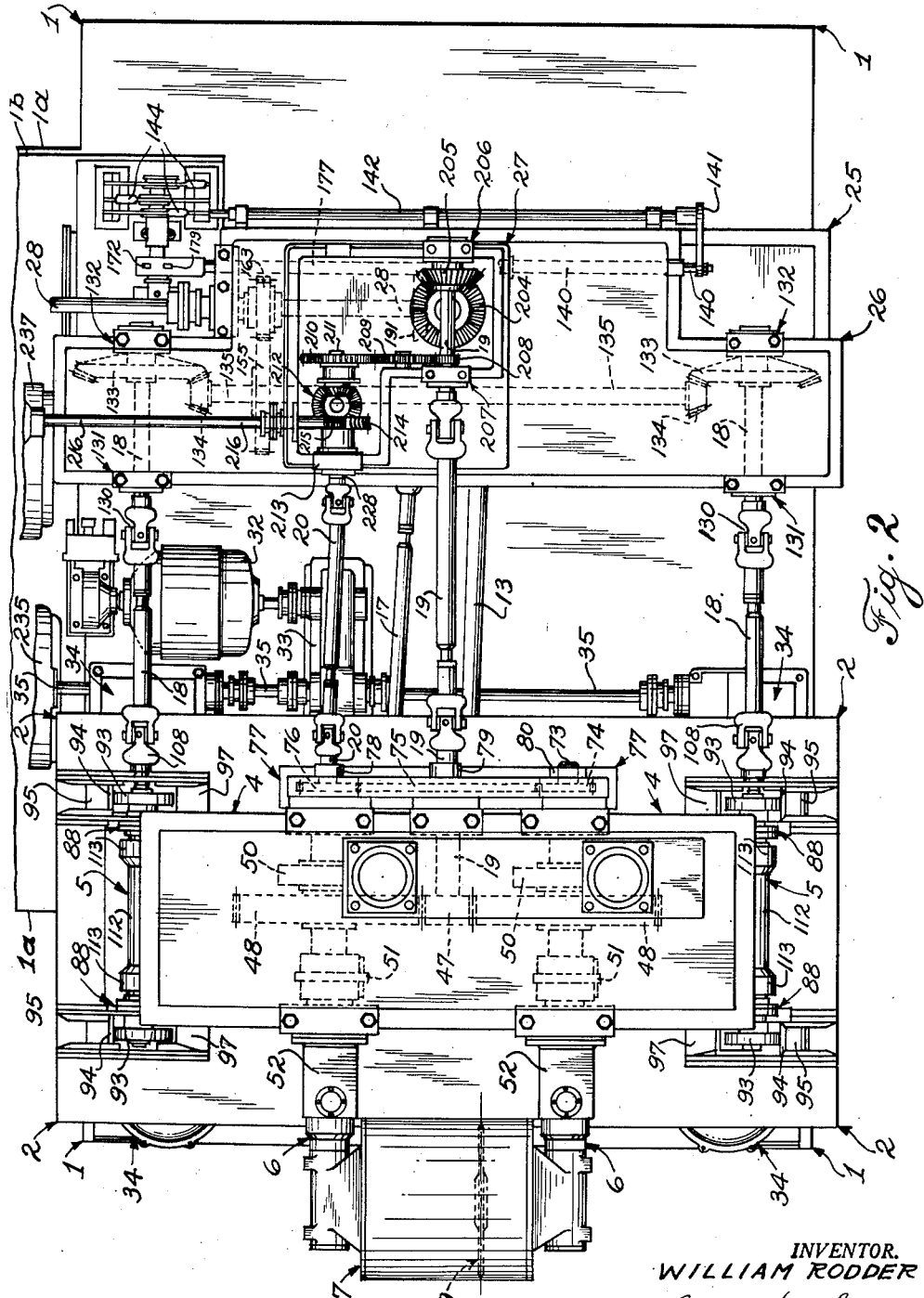
Figure 2 is a plan of the apparatus as a whole exclusive of the main drive motor, reduction gear unit and variable speed drive, the plan being on a larger scale and in greater detail than the plan of Figure 1.

The after portion of the apparatus, as shown in Figures 1, 2, 4 and 11, is made up of a bottom section 25, a lower gear box 26, and an upper gear box 27. All three appear in Figures 2, 4 and 11. The bottom section 25 is supported on base 1, and supports lower gear box 26 which in turn supports upper gear box 27. Main drive shaft 28 enters lower gear box 26 as shown in Figures 2 and 12, conveying power to it, as shown in Figure 1, from a P. I. V. (positive infinitely variable drive) 29, a reduction gear unit 30, and main drive motor 31, all of which are mounted on a platform 1b that is located above lateral extension 1a of primary supporting structure 1. As described in application said Patent No. 2,645,001, the main drive motor is electrically synchronized with the drive of the mill with which the saw is used so that the speed of the motor varies directly with the speed of the mill.

A second motor 32 (see Figures 2 and 4), also referred to as the adjusting motor, is mounted on primary supporting structure 1 and drives, through gear box 33 and shafts 35, two worm-and-wheel assemblies 34 at the base of the two jacks 3 at the rear of secondary supporting structure 2. Such worm-and-wheel assemblies are generally similar to those shown in said Patent No. 2,645,001. From the rear worm-and-wheel assemblies 34, two side shafts 36, one on each side of the apparatus, extend forwardly to two like worm-and-wheel assemblies 34 at the base of the two jacks 3 at the front of secondary supporting structure 2.

In order to maintain proper alignment between primary supporting structure 1 and secondary supporting structure 2, secondary supporting structure 2 is provided with downwardly facing brackets 38 and guide rods 38a of the nature of posts. As shown in Figures 4, 6 and 7, the lower ends of the latter cooperate with rollers 39 supported on pins 39a mounted in boxes 40. Rollers 39 are preferably grooved as shown to conform to the cylindrical shape of the guide rods 38a. The rollers 39 and receptacles 40 form with guide rods 38a what may be termed guide assemblies for steadying secondary supporting structure 2.

Figure 10:
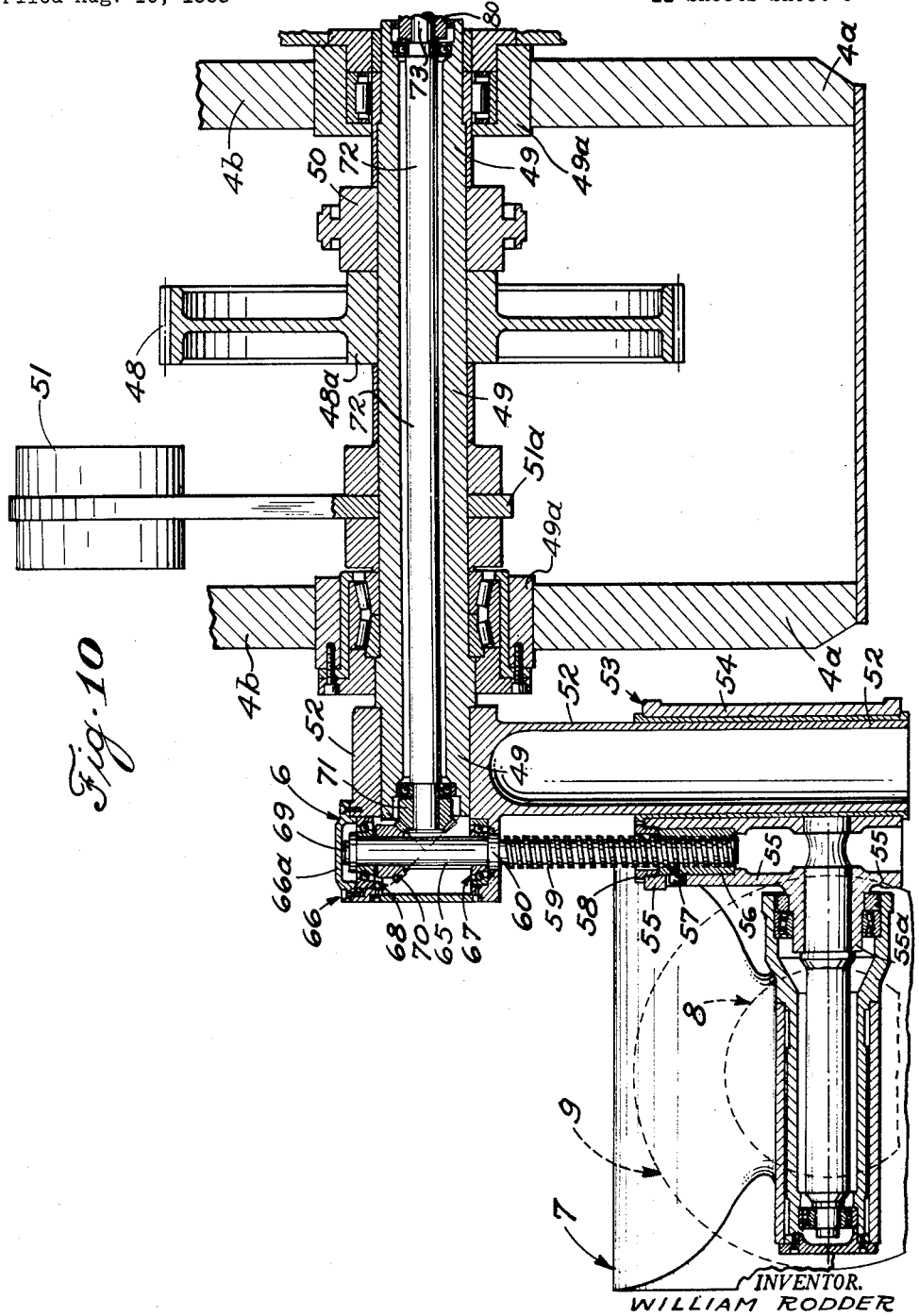
Figure 10 is a vertical section through one of the cranks taken on line 10—10 of Figure 9.

Referring now to Figures 9 and 10, which show how saw-supporting cranks 6 are mounted and driven, shaft 19 for driving cranks 6 terminates in a bearing assembly 45 located in a rigid support 46 (Figure 9) forming part of lower section 4a of superstructure 4. Immediately to the rear of bearing assembly 45 and support 46, shaft 19 carries a pinion 47 meshing with two large gears 48 which are rigidly mounted on two hollow shafts 49 that are themselves supported by bearing assemblies located in bearing blocks 49a mounted in the transversely extending front and rear walls of superstructure 4. Rigidly affixed to hollow shafts 49 just behind gears 48 are two eccentrics 50 forming part of a pneumatic balancing system of the kind shown, described and claimed in Rodder Patent 2,618,045. Such a system is desirable to compensate for unbalance that cannot be compensated by the two counterweights 51, which are rigidly attached by arms 51a to hollow shafts 49. Gears 48, eccentrics 50 and counterweights 51 are all located within superstructure 4, occupying most of the space between its front and rear walls.

Forward of the front wall of superstructure 4 the outwardly projecting ends of hollow shafts 49 mount the two saw-supporting cranks 6. As indicated in Figure 10, each crank includes a hollow, elongated crank arm 52 of generally cylindrical shape and, slideably mounted on it, a crank pin carrier 53. Each crank-pin carrier 53 has a sleeve-lined cylindrical body portion 54 encompassing cylindrical crank arm 52 and, formed integrally with it, a forwardly presented supporting portion 55. The latter is provided with two intersecting bores, one longer than the other, the longer running parallel to and the shorter running transversely of the crank arm 52. The transversely extending bore, which is provided to accommodate the crank pin proper, is centered within a sleeve-like extension 55a that projects from and is formed integrally with the forwardly presented portion 55 of crank pin carrier 53.

On a shoulder in the longer of the two bores, shown in Figure 10 as running vertically, is supported an internally threaded nut 56 of sleeve-like proportions. Nut 56 is held against rotation and secured in position by a screw 57 which projects through forwardly presented portion 55 of crank pin carrier 53 into the body of nut 56 near the upper end thereof (Figure 10). Above set screw 57, forwardly projecting portion 55 is tapped interiorly thereof to receive an annular retaining screw 58, the internal diameter of which is substantially greater than the internal diameter of nut 56. This leaves within cap screw 58 the clearance required by screw shaft 59, which cooperates with nut 56 to move crank pin carrier 53 up or down on crank arm 52.

The threaded portion of screw shaft 59 terminates just below a locating collar 60, above which the screw shaft has a generally cylindrical portion 65 which is enclosed within a housing 66 formed as shown in Figure 10. In Figure 9, the covers therefor, designated 66a in Figure 10, are omitted. In housing 66 are a lower bearing assembly 67 and an upper bearing assembly 68 that support screw shaft 59 for rotation. The screw shaft is located in housing 66 by retaining nut 69 and collar 60.

The structure just described, forming part of the right-hand crank of the pair shown in Figure 9, is duplicated in the left-hand crank. Each screw shaft 59 carries at its upper end a rigidly mounted bevel gear 70 that meshes with a similar bevel gear 71 on an adjusting shaft 72 rotating in suitably located bearing assemblies disposed interiorly of hollow shaft 49. There are therefore two such adjusting shafts 72, one within each of the two hollow shafts 49. One of the two adjusting shafts 72, that shown at the right in Figure 9, is provided at its rear end, which projects out of superstructure 4, with a short integrally formed extension 73 of the nature of a stub shaft. On it is rigidly mounted a gear 74 meshing with an idler 75 on shaft 19 which idler meshes with a gear 76 that is similar to and mounted in substantially the same manner as gear 74 except that gear 76 is mounted on shaft 20, which constitutes an extension of the left-hand shaft 72 in Figure 9. As shown in Figure 2, shaft 20 extends from the after portion to the forward portion of the apparatus, entering the latter by way of a gear housing 77 which encloses gears 74 and 76 and idler 75.

Gear housing 77 consists of a lower section 77a and an upper section 77b (Figures 5, 6 and 7). As is apparent from Figure 9, the extension of left-hand adjusting shaft 72 which becomes part of shaft 20 is journalled in a bushing 78 positioned in the rear wall of housing 77. Drive shaft 19 for the saw-supporting cranks 6 is similarly journalled in a similar bushing 79. The extensions 73 on right-hand adjusting shaft 72 terminates in a bushing 80 that is generally similar to bushings 78 and 79.

Rotation of shaft 20 produces like rotation of the adjusting shaft 72 to which it is connected and by means of gears 74 and 76 and idler 75 produces similar rotation of the other adjusting shaft 72.

Turning now to the construction and operation of the lateral crank assemblies 5 that flank superstructure 4 as shown in Figures 2, 3, 5 and 6, it will be noted that lower section 4a and upper section 4b of superstructure 4 abut in a joint 85 between an outwardly turned flange 86 on the upper section and a like flange 87 on the lower section. Advantage is taken of the great strength of the resulting double-flanged construction in providing for the reciprocation of the superstructure 4. To that end, four lifting bars 88, two for each crank assembly 5, are incorporated in superstructure 4, being applied to it just below flange 87 on lower section 4a. Two of the four lifting bars 88 appear in Figure 3.

Lifting bars 88 are shaped as shown in Figure 15, and, as shown in section in Figure 8, each is made up of two polygonal steel plates 89 fastened together to form a unitary structure. The lifting bars 88 are preferably welded to the lower face of flange 87 and are provided at their outer ends with rectangular openings. The ends of the openings are closed by retainers 90 that hold in place within the openings bearing blocks 91 for the wrist pins 92 that form part of the top portion of each crank assembly 5.

As shown in Figure 8, each wrist pin 92 carries two rollers 93, one at each end thereof. The rollers are mounted on those portions of the wrist pin that project through bearing blocks 91; i. e., they are located outwardly of lifting bars 88. Each roller 93 bears against a wearing strip 94 on an upright guide 95 (see Figures 2, 3, 5 and 6) that is rigidly mounted on secondary supporting structure 2. Thus, there are rollers and guides located adjacent the four corners of the superstructure 4.

As shown in Figures 6 and 7, the guides 95 project upwardly from the bases 96 of trapezoidal supporting members 97. Thus for each crank assembly 5 there are two uprights 95 and two trapezoidal supporting members 97. In each crank assembly, each such supporting member 97 is used to mount a roller bearing assembly, the assembly toward the rear of the apparatus being indicated at 98 and the assembly toward the front being indicated at 99; these bearings support eccentric 105 best seen in Figure 8, shafts 106 and 107 of the eccentric being journalled in bearings 98 and 99, respectively. The eccentric is driven by shaft 18 which is coupled by universal joint 108 to stub shaft 106.

Eccentric 105 is connected to wrist pin 92 by a connecting rod comprising a sleeve 109 substantially the same length as eccentric 105 to which is attached a trapezoidal web 110 reinforced at its ends by flanges 111 which web has attached thereto toward the top thereof a somewhat shorter sleeve 112. Sleeve 109 is journalled on eccentric disks 105a and 105b of eccentric 105. Sleeve 112 has two enlarged ends 113 each of which accommodates a roller bearing 114 on wrist pin 92. The sleeve is held against endwise movement by bearing blocks 91; similarly, endwise movement of sleeve 109 is prevented by split clamping rings 115 at the ends thereof. Rotation of eccentric 105 produces up-and-down reciprocation of wrist pin 92 and, through the intervention of lifting bars 88, corresponding vertical reciprocatory movement of superstructure 4 on secondary supporting structure 2.

Superstructure 4, which incorporates the entire unit comprising the saw-supporting cranks 6 at the front of the apparatus, naturally has considerable mass. As a rule, therefore, it will be found desirable to balance at least partially the inertia forces resulting from the acceleration and deceleration of the superstructure by the eccentric 105 and associated mechanism. Accordingly, lower section 4a of superstructure 4 is preferably provided, as shown in Figure 6, with rigidly-attached depending lugs 120 and, cooperating therewith, pin-and-yoke assemblies 121, 122, the yoke 122 in each case being joined to a piston rod 123 which extends downward into an air cylinder 124 mounted on a base 125 that is attached to the top of primary supporting structure 1. In the embodiment of the invention shown, there are two such air cylinders, one on each side of the longitudinal apparatus as a whole. Compression of air beneath the pistons within the cylinders 124 cushions the downward movement of the superstructure and acts at least partially to balance the force of gravity acting on the superstructure and the inertia forces incident to the reversal of direction thereof.

Referring now to Figures 2, 4, 11 and 12, it will be noted that the shafts 18 for driving the lateral crank assemblies 5 include, in addition to the previously mentioned universal joints 103, universal joints 130 located immediately forward of the forward wall of lower gear box 26. Where shafts 18 pass through such wall, they are supported in bearings 131. The rear ends of the shafts 18 are supported in similar bearings 132. A bevel gear 133 is keyed to each of the shafts 18 near the bearings 132. Bevel gears 133 mesh with pinions 134 at each end of a cross shaft 135 mounted in suitable bearings. One such bearing, designated 136, appears near the right-hand end of Figure 12.

Cross shaft 135 is driven through a jaw clutch having a slideable clutch element 137 that is keyed to the shaft by key 138. Clutch element 137 may be moved along shaft 135 by a yoke 139 pivoted at 139a to the inside face of the forward wall of lower gear box 26. Yoke 139 straddles movable clutch element 137 to which it is connected. At its other end, yoke 139 is connected to a sliding rod 140 located largely, but not entirely, within lower gear box 26. At its projecting outer end, rod 140 is coupled by a connecting element 141 to a second sliding rod 142 that extends lengthwise of lower gear box 26 immediately to the rear thereof. At its far end, near the left-hand end of Figure 12, sliding rod 142 carries a connecting element 143 by which it is actuated from one of the operating handles 144 appearing in Figures 2, 4 and 11. By pulling on the appropriate handle, outside sliding rod 142 and therefore inside sliding rod 140 may be moved from right to left as seen in Figure 12, thereby engaging the jaws of movable clutch element 137 with the jaws of the cooperating clutch element 145.

The latter, together with a bevel gear 146, is rigidly mounted by means of a key 147 on a hollow shaft 148 that surrounds cross shaft 135 throughout approximately half of its length. Hollow shaft 148 is mounted in bearing assemblies 149 and 150 on transverse structural elements forming part of the framework of lower gear box 26; see Figure 12. Thus when clutch elements 137 and 145 are engaged, power transmitted from main drive shaft 28 to hollow shaft 148 is communicated by clutch elements 145 to clutch element 137 and thence to cross shaft 135, gears 133 and 134 at the ends thereof, and shafts 18, which drive the lateral crank assemblies.

Power is communicated from main drive shaft 28 to hollow shaft 148 through a speed-change mechanism comprising three gears 155, 156 and 157 of progressively increasing diameter, the hubs 158, 159 and 160, respectively, of which are keyed to hollow shaft 148 by means of keys 161 and 162. Main drive shaft 28, which parallels hollow shaft 148, carries pinions 163, 164 and 165 that mesh with gears 155, 156 and 157, respectively. Pinions 163, 164 and 165 are supported on roller bearings on the main drive shaft as shown in Figure 12.

Gears 163 and 164 on main drive shaft 28 may be selectively connected by a movable clutch element 166 that is mounted on the splined exterior of a sleeve 167 which is itself rigidly mounted by means of a key 168 on main drive shaft 28. Clutch element 166, which is shown in neutral position, may be moved as desired either to the left or to the right in Figure 12 to engage either the jaws at the left-hand end thereof with jaws on gear 163 or the jaws on the right-hand end thereof with jaws on gear 164.

In order to shift movable clutch element 166, a shifter yoke 169 is mounted on a hollow shaft 170 that is supported in a bushing 171 near the main drive shaft 28. By means of a connecting element 172, to which is coupled one of the handles 144 seen in Figures 2, 4 and 11, hollow shaft 170 may be moved to the left or right as seen in Figure 12. If it is moved in either direction, the jaws on movable clutch element 166 will engage the jaws on gear 163 or gear 164, as the case may be, thus transmitting power from main drive shaft 28 through splined sleeve 167 to movable clutch element 166 and thence to gears 163 and 155 or gears 164 and 156.

A second movable clutch element 173 is slideably mounted on a splined sleeve 174 that is itself rigidly mounted on main drive shaft 28 by key 175. As shown in Figure 12, clutch element 173 is provided with jaws which are adapted to engage like jaws on gear 165. Clutch element 173 is shown in neutral position in Figure 12, from which it can be moved to the left as seen in Figure 12 into driving engagement with gears 165 and 157 by an actuating member 176 mounted on a rod 177 supported at one end in a bushing 178. Throughout much of its length, rod 177 is surrounded by hollow shaft 170. Near its outer end, hollow shaft 170 is provided with an opening (not shown) permitting a connection to be made between rod 177 and one of the handles 144. The connecting element is shown at 179. By actuation of the appropriate handle 144, rod 177 may be moved axially thereof. In consequence, the jaws on movable clutch element 173 may be engaged with or disengaged from the jaws on gear 165.

By means of the transmission mechanism just described, the speed ratio between the main drive shaft 28 and the driven shafts 135 and 148 can be varied. In the embodiment shown, the ratios are 2 to 1, 3 to 1 and 4 to 1 when the drive is through gears 155, 156 and 157, respectively. As explained below, this enables the saw to make 2, 3 or 4 revolutions for one complete revolution of eccentric 15 which carries cam 12, and also for one complete revolution of eccentrics 105 that raise and lower superstructure 4.

As further appears from Figure 12, movable clutch element 137 carries a rigid strap or link by which sliding movement of clutch element 137 is communicated to a rod 181 supported on the forward wall of lower gear box 26 by brackets 182. At the left-hand end thereof as seen in Figure 12, rod 181 is provided with a shoulder and a nut 181a for connecting it to link 180. At its opposite end, rod 181 is provided with a detent 181b adapted to enter into a recess 183 in the periphery of a disk 184 that is keyed to the shaft 18 at the right-hand end of lower gear box 26. These same parts are shown in elevation in Figure 14, from which it can be seen that disk 184 carries a recess 183 into which detent 181b can enter. Thus when movable clutch element 137 is disengaged from clutch element 145 detent 181b enters recess 183 and locks shafts 18 and the two lateral crank assemblies 5 in a predetermined position.

In order to drive eccentric 15, a bevel gear 146 on hollow shaft 148 meshes with an upwardly facing bevel gear 185 rigidly mounted on the upper end of a downwardly extending vertical shaft 186 journalled in a bearing sleeve 187 fixed to the floor of lower gear box 26 (Figure 13). The lower end of vertical shaft 186 extends into and is journalled in a housing 188 (Figures 11 and 16) for a worm-and-wheel unit of which the wheel 189 is mounted on eccentric shaft 17 and the worm 190 is mounted on vertical shaft 186. Thus through bevel gears 146 and 185, hollow shaft 148 drives vertical shaft 186. The latter, through the worm-and-wheel unit in housing unit 188, drives eccentric shaft 17, gears 16a and 15a, and eccentric 15.

Referring again to Figures 12 and 13, one end of main drive shaft 28 has a bevel gear 191 keyed to it. Gear 191 meshes with an upwardly facing bevel gear 192 mounted on a vertical shaft 193 which is journalled in a bearing sleeve 194. Shaft 193 extends through the floor of lower gear box 26 into a second housing 195 for a worm-and-wheel unit, such second housing 195 being located as shown in Figure 16 to the rear and to one side of housing 188. As appears from Figures 11 and 16, vertical shaft 193 drives wheel 196 through worm 197, the worm being mounted on shaft 193. Wheel 196 is mounted on cam shaft 13. In consequence, cam 12 at the front end of the apparatus is driven through the various parts just described at a speed dependent upon the speed of main drive shaft 28.

Also meshing with bevel gear 191 on main drive shaft 28 is downwardly facing bevel gear 201 shown in Figures 11 and 13. Bevel gear 201 is mounted on a vertical shaft 202 which is journalled in a bearing sleeve 203 (Figure 11) that projects through the top of lower gear box 26 into upper gear box 27. At the upper end of shaft 202 is an upwardly facing bevel gear 204 which meshes with a forwardly facing bevel gear 205 mounted at the rear end of the shaft 19 from which saw-supporting cranks 6 at the front end of the apparatus are driven. Shaft 19 is supported as shown in Figure 2 in suitable bearings in bearing blocks 206 and 207 in the rear and front walls, respectively, of upper gear box 27. The ratios of the gear trains driving the cranks 6 and the cam shaft 13 from the main drive shaft are such that the cranks and the cam 12 rotate at the same speed, but in opposite directions.

Mounted on shaft 19 to the rear of bearing block 207 is a pinion 208 meshing with an idler 209 which itself meshes with a gear 210, these parts being most clearly shown in Figure 2. As appears from Figure 17, gear 210 is mounted on a stub shaft 211 that projects forward into a differential 212 housed in upper gear box 27 to the rear of bearing block 213 for the rear end of shaft 20. On differential 212 is mounted a wheel 214 cooperating with a worm 215 (Figure 11) on a cross shaft 216 coupled as hereinafter explained to adjusting motor 32. Cross shaft 216 serves as an input shaft for power supplied by the adjusting motor, which it transmits to differential 212 through wheel 214 and worm 215.

As further appears from Figure 17 differential 121 incorporates a planet carrier 221 and two planet gears 222, the latter being carried on the ends of a shaft 223. The stub shaft 211 carrying gear 210 enters planet carrier 221 as shown in Figure 17, being journalled in a bearing assembly within a hollow supporting shaft 225 that is itself supported within a rearwardly projecting sleeve 226 forming part of planet carrier 221. At the end thereof within planet carrier 221, stub shaft 211 carries an input pinion 224.

Opposing input pinion 224 is an output pinion 227 mounted on a stub shaft 228 that is coupled to the near end of shaft 20. Stub shaft 228 is journalled in a bearing assembly in a hollow shaft 229 which is itself journalled in a forwardly projecting sleeve 230 forming part of planet carrier 221. Like the rearwardly projecting sleeve 226 on the opposite side of the differential 212, forwardly projecting sleeve 230 is supported in one of the structural elements forming part of upper gear box 27. The operation of differential 212, including wheel 214, worm 215 and cross shaft 216, is similar to the operation of the corresponding parts in said Patent No. 2,645,001. Briefly, the shaft 20 and the adjusting shafts 72 normally are driven at the same speed and in the same direction as the crank shafts 49 and the cranks are maintained at fixed length. However, by operation of the adjusting motor, the shafts 20 and 72 can be made to rotate with respect to shafts 49, thus rotating the adjusting screws 59 and changing the length of the cranks. This operation can be carried out while the apparatus is in operation.

The drive from the adjusting motor to the differential is through cross shaft 35 and a gear box 235 that is located on extension 1a of primary supporting structure 1 (Figures 1 and 2). As shown in Figure 11, a rearwardly extending lower-level shaft 236 takes power from gear box 235 to meshing bevel gears (not shown) within a housing 237 at the base of an upwardly extending pipe column 238. The latter, which is supported by a bracket 239 from lower gear box 26 as shown in Figure 11, is provided with shafting by which power from the bevel gears at the rear end of rearwardly extending shaft 236 is transmitted to a pair of bevel gears in a globe shaped housing 240 at the upper end of pipe column 238. From the gears in housing 240 power is communicated to the differential 212 in upper gear box 27, the power train including cross shaft 216, worm 215 and wheel 214 on planet carrier 221.

If desired, power to operate an indicator of the kind described in said Patent No. 2,645,001 may be taken off at the top of pipe column 238 by a suitable system of shafting and gears connected to the gears in housing 240.

The P. I. V. 29 may be adjusted through an upper-level shaft 241 (Figures 1 and 11) paralleling shaft 236 by which power may be taken from suitably arranged gears within gear box 235 and transmitted to a second pair of meshing bevel gears (likewise not shown) in housing 237. By suitable shafting in a second pipe column 242, supported by a bracket 243 as shown in Figure 11, the power is transmitted to a housing 244 at the top of pipe column 242. Within housing 244 suitable gearing transmits it to a shaft extension 245 (Figures 1 and 11) on the control screw for P. I. V. 29. In this manner, P. I. V. 29 can be adjusted by adjusting motor 32.

Appropriate clutches are provided in the drives for the various adjustments so that the adjustments of speed, through the P. I. V., crank arm length and the jacks, can be made simultaneously or separately as desired. All of these adjustments can be made while the apparatus is running and the gearing is selected so that if the adjustments are made simultaneously, the correct relationships between speed, crank arm length and spacing between the primary and secondary supporting structures are substantially maintained.

The operation of the apparatus is essentially the same as described in said Patent No. 2,645,001, except that the superstructure 4 and thus the entire rotary support for the saw assembly are given a vertical reciprocating motion to make it possible to handle work of greater diameter than can be handled in the apparatus of the said patent or to handle work of lesser diameter with less or no deflection of the work by the cam. Briefly, the apparatus is set up by selecting the desired speed ratio between the rotation of the crank arms and the rotation of cam-shaft supporting eccentric 15 and eccentrics 105 of crank assemblies 5 that raise and lower the superstructure 4. The P. I. V. is adjusted to give the desired relationship between the speed of the work and the rotational speed of the saw assembly in its orbit, thereby to determine the length of cut. The length of the crank arms is adjusted to give approximately the correct lineal speed to the saw as the cut is being made and the jacks 3 are adjusted to give the correct spacing between the primary and secondary supporting structure so that the saw will sever the work completely but will not engage the cam 12 at the time a cut is made, nor touch the work when no cut is being made. Final adjustments are made during the operation of the apparatus. The driving mechanism is such that the rotation of the cam 12 and the saw assembly are synchronized so that the notch 11 receives the saw when a cut is being made, the cam 12 and the saw assembly rotating at the same rotational speed but in opposite directions.

The drive for the eccentric 15 that lifts the cam and the drive for eccentrics 105 that operate the crank assembly 5 are also synchronized so that at the time a cut is made the superstructure 4 is lowered to its lowermost position and the cam 12 is raised by the eccentric 15 to its highest position. The eccentric 15 and the crank assemblies 5, however, operate to bring the parts into cutting position only once in every two, three or four revolutions of the crank arm 6 in the embodiment shown in the drawings.

Thus, with the present apparatus it is possible to cut pipe of substantially larger diameter than could be handled with the apparatus of said Patent No. 2,645,001 without excessive deflection of the pipe. The cut is completed in a comparatively short distance of travel of the pipe and a correspondingly small amount of travel of the saw in its orbital path. Obviously, the same apparatus can be used for smaller pipe and in the case of smaller pipe the vertical movement of the superstructure may be eliminated by disconnecting the drive for the eccentrics 5 in which case the apparatus operates in substantially the same fashion as the apparatus of said Patent No. 2,645,001 or, if desired, the drive for the eccentric 15 may be disconnected in which case the pipe will not be deflected by the cam 12 but will merely be supported thereby and the movement required to make the saw intersect the path of the work will be brought about entirely by the vertical movement of the superstructure 4 through the operation of the crank assemblies 5.

It is intended that the patent shall cover, by summarization in the appended claims, all features of patentable novelty residing in the invention.

I claim:

1. Apparatus for severing successive longitudinal sections from continuously moving elongated work such as pipe, tube, rod and the like comprising a cutting tool; means for guiding the work in a normal path; a rotary support for said cutting tool adapted to move said tool in an orbital path approaching but not intersecting the normal path of the work, and means operated in timed relationship with the rotation of said rotary support for periodically moving said rotary support toward the normal path of the work at a frequency less than the rate of rotation of the cutting tool in its orbital path whereby the paths of the work and the cutting tool are caused to intersect.

2. Apparatus as defined in claim 1 wherein the means for periodically moving said rotary support toward the normal path of the work includes a pair of crank assemblies.

3. Apparatus as defined in claim 2 wherein a single motor is employed to drive said rotary support to move said tool in its orbital path and to drive said crank assemblies.

4. Apparatus as defined in claim 3 wherein change speed gearing is provided to change the frequency of movement of said rotary support toward the normal path of the work with respect to the rate of rotation of said cutting tool in its orbital path.

5. Apparatus for severing successive longitudinal sections from continuously moving elongated work such as pipe, tube, rod and the like comprising a cutting tool; means for guiding the work in a normal path; a rotary support for said cutting tool adapted to move said tool in a normal orbital path approaching but not intersecting the normal path of the work; means for periodically deflecting the work from its normal path toward the normal path of the cutting tool at a frequency less than the rate of rotation of the cutting tool in its orbital path; and means operating in timed relationship with said deflecting means for moving said rotary support toward the normal path of the work at the time that said deflecting means deflects the work toward the normal path of the cutting tool whereby the paths of the cutting tool and the work are caused to intersect.

6. Apparatus for severing successive longitudinal sections from continuously moving elongated work such as pipe, tube, rod and the like comprising a cutting tool; means for guiding the work in a normal path; a rotary support for said cutting tool adapted to move said tool in a normal orbital path approaching but not intersecting the normal path of the work; a cam for periodically deflecting the work from its normal path toward the path of the cutting tool; means for periodically moving the cam toward the path of the work at a frequency less than the rate of rotation of the cutting tool in its orbital path, and means operating in timed relationship with said cam moving means for moving said rotary support toward the normal path of the work at the time that the cam is moved toward the path of the cutting tool whereby the paths of the cutting tool and the work are caused to intersect.

7. Apparatus according to claim 6 wherein the cam is carried by a primary supporting structure, a secondary supporting structure is adjustably mounted on the primary supporting structure and the rotary support for the cutting tool is carried by a superstructure mounted for reciprocal movement with respect to said secondary supporting structure.

8. Apparatus for severing successive longitudinal sections from continuously moving elongated work such as pipe, tube, rod and the like comprising a cutting tool; means for guiding the work in a normal path; a rotary support for said cutting tool adapted to move said tool in a normal orbital path approaching but not intersecting the normal path of the work; a cam for periodically deflecting the work from its normal path toward the normal path of the cutting tool; means for driving the cam at substantially the same rotational speed as but in the opposite angular direction from the rotary support for the cutting tool; an eccentric driven in timed relation with the rotary support for the cutting tool for periodically moving the cam toward the path of the tool, and means driven in timed relationship with the rotation of said rotary support for moving said rotary support toward the normal path of the work at the time that the cam is moved toward the path of the cutting tool whereby the paths of the cutting tool and the work are caused to intersect.

9. A power saw comprising a stationary supporting structure, a movable superstructure on the supporting structure, said movable superstructure incorporating an independently movable unit including a saw and means for driving the saw, and a crank assembly interposed between the supporting structure and the movable structure for imparting to the superstructure cyclically recurring movement in a predetermined path and thus superimposing its movement on the movement of the independently movable unit including the saw.

10. A metal-cutting machine comprising a stationary supporting structure; a movable superstructure mounted for rectilinear reciprocation on the supporting structure, said movable superstructure incorporating an independently movable unit including a cutting tool, means for moving the cutting tool in an orbital path, and means for reciprocating said superstructure in straight-line motion in timed relation to the movement of the cutting tool in its orbital path.

11. A metal-cutting machine as in claim 10 in which cushioning means are employed to cushion the straight-line movement of the movable superstructure.

12. A metal-cutting machine as in claim 11 in which the cushioning means comprise a pneumatic cylinder and piston assembly.

13. A metal-cutting machine comprising a primary stationary supporting structure; a stationary secondary supporting structure that is adjustably mounted on the primary supporting structure; a superstructure that is movable on the secondary supporting structure, said superstructure incorporating an independently movable unit including a rotary saw and means for moving said saw in an orbital path, and an assembly interposed between the secondary supporting structure and the superstructure for imparting to the superstructure a cyclically recurring movement in a predetermined path.

14. A metal-cutting machine comprising a cutting tool; supporting structure for the cutting tool, part of said supporting structure being stationary and part of the said supporting structure being movable; means interposed between the stationary and movable parts of the supporting structure for moving the movable part; and, for stabilizing the movable part against unwanted movement thereof, guide means taking the form of an end-supported post on one part and, on the other part, a receptacle accommodating the unsupported end of such post.

15. A metal-cutting machine comprising a primary supporting structure; a secondary supporting structure; a superstructure; a cutting tool forming part of the superstructure; means for moving the cutting tool relative to the superstructure; means for moving the superstructure relative to the secondary supporting structure; means for moving the secondary supporting structure relative to the primary supporting structure; and, for stabilizing the secondary supporting structure against unwanted movement thereof, a guide assembly interposed between the primary supporting structure and the secondary supporting structure, said guide assembly consisting of a guided element attached to one of said supporting structures and a guiding element attached to the other of said supporting structures.

16. A power tool comprising a supporting structure, a reciprocable superstructure on the supporting structure, said reciprocable superstructure including a rotary tool and means for carrying the tool in an orbital path; a single power means for imparting the reciprocatory movement to the superstructure and for driving said tool carrying means, and speed-change means for changing rates of speed of said superstructure and said tool carrying means relative to each other.

17. A power tool as in claim 16 in which the superstructure is reciprocated by two crank assemblies, one on each side of the superstructure.

References Cited in the file of this patent

UNITED STATES PATENTS

| | | |
|---|---|---|
| 2,332,013 | Rudert et al. | Oct. 19, 1943 |
| 2,618,047 | Mansell | Nov. 18, 1952 |
| 2,657,453 | Brodhun | Nov. 3, 1953 |